US008955098B2

(12) United States Patent
Lortz et al.

(10) Patent No.: US 8,955,098 B2
(45) Date of Patent: Feb. 10, 2015

(54) ESTABLISHING NETWORK SECURITY USING INTERNET PROTOCOL SECURITY POLICIES

(75) Inventors: Victor B. Lortz, Beaverton, OR (US); Ylian Saint-Hilaire, Hillsboro, OR (US); James L. Jason, Jr., Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/619,811

(22) Filed: Sep. 14, 2012

(65) Prior Publication Data

US 2013/0311766 A1 Nov. 21, 2013

Related U.S. Application Data

(63) Continuation of application No. 09/603,878, filed on Jun. 26, 2000, now abandoned.

(51) Int. Cl.
*G06F 9/00* (2006.01)
*H04L 29/06* (2006.01)

(52) U.S. Cl.
CPC ............ *H04L 63/164* (2013.01); *H04L 63/102* (2013.01)
USPC .............................. 726/14; 713/169; 713/171

(58) Field of Classification Search
USPC ...................................... 726/14; 713/169, 171
See application file for complete search history.

(56) References Cited

U.S. PATENT DOCUMENTS

| 5,577,209 | A | 11/1996 | Boyle et al. |
| 5,784,566 | A | 7/1998 | Viavant et al. |
| 5,950,195 | A | 9/1999 | Stockwell et al. |
| 6,055,236 | A | 4/2000 | Nessett et al. |
| 6,058,115 | A | 5/2000 | Sawyer et al. |
| 6,141,686 | A | 10/2000 | Jackowski et al. |
| 6,615,260 | B1 * | 9/2003 | Honda et al. .................. 709/224 |
| 6,651,168 | B1 | 11/2003 | Kao et al. |
| 2002/0062344 | A1 * | 5/2002 | Ylonen et al. ................ 709/204 |
| 2004/0049585 | A1 * | 3/2004 | Swander ....................... 709/229 |

FOREIGN PATENT DOCUMENTS

| EP | 0862105 | 2/1998 |
| EP | 0854621 | 7/1998 |

(Continued)

OTHER PUBLICATIONS

"IP Security for Microsoft Windows 2000 Server," http://msdn.microsoft.com/library/background/html.msdn_ip_security.htm, 10pp Mar. 1999.

(Continued)

*Primary Examiner* — Christopher Brown
(74) *Attorney, Agent, or Firm* — Blakely, Sokoloff, Taylor & Zafman LLP

(57) ABSTRACT

Techniques for configuring network security include obtaining non-packet flow information, evaluating a policy rule based on the obtained information, and proposing a security arrangement based on the evaluation. The non-packet flow information can include, for example, authentication information obtained during an Internet Key Exchange protocol session or information obtained from a layered service provider. Therefore, policies such as Internet Protocol security (IPsec) policies can be defined and implemented so that they more accurately reflect the network's security requirements.

26 Claims, 3 Drawing Sheets

(56) References Cited

FOREIGN PATENT DOCUMENTS

EP 0909075 4/1999
WO WO-99/67930 12/1999

OTHER PUBLICATIONS

"Primer: IPSec," http://newbridqe.com/doctvpes/techprimer/ispsec/index.html, 2pp.(Jun. 2, 2000).

"PCT Search Report", WO 02/01827, (Jan. 3, 2002), 1/5.

Examination Report for European Patent Application No. 01 948 307.2-1244 mailed Feb. 1, 2011, 4 pgs.

Notice of Allowance for European Patent Application No. 01 948 307.2-1244 mailed Dec. 23, 2011, 26 pgs.

Grant Decision for European Patent Application No. 01 948 307.2-1244 mailed Jul. 5, 2012, 2 pgs.

\* cited by examiner

| |
|---|
| Policy Object 1:<br>From Workgroup 1 (Endpoint List $S_{11}$ ... $S_{1n}$) to Workgroup 1 (Endpoint List $S_{11}$ ... $S_{1n}$)<br>Apply ruleset X11 |
| Policy Object 2:<br>From Workgroup 1 (Endpoint List $S_{11}$ ... $S_{1n}$) to Workgroup 2 (Endpoint List $S_{21}$ ... $S_{2n}$)<br>Apply ruleset X12 |
| Policy Object 3:<br>From Workgroup 1 (Endpoint List $S_{11}$ ... $S_{1n}$) to Workgroup 3 (Endpoint List $S_{31}$ ... $S_{3n}$)<br>Apply ruleset X13 | ic
ESTABLISHING NETWORK SECURITY USING INTERNET PROTOCOL SECURITY POLICIES

This application is a continuation of U.S. patent application Ser. No. 09/603,878 filed Jun. 26, 2000 now abandoned and claims priority to and is incorporated herewith.

BACKGROUND

The invention relates to establishing network security using Internet Protocol security (IPsec) policies.

IPsec is a network-layer security framework for implementing security for communications on networks using the Internet Protocol (IP) through the use of cryptographic key management procedures and protocols. Communications between two endpoints of an IP traffic flow are made secure by the IPsec protocol on an individual IP packet basis. IPsec entities at connection endpoints have access to and participate in operations that make a common connection secure.

IPsec establishes and uses a security association to identify a secure channel between two endpoints. A security association is a unidirectional session between two termination endpoints. One endpoint sends IP packets, and a second endpoint receives the IP packets. A minimum of two security associations is required for secure, bi-directional communications. The two endpoints can use the Internet Key Exchange (IKE) protocol to negotiate mutually acceptable encryption algorithms, associated parameters and secret keys to protect network traffic. The IKE protocol supports various authentication mechanisms including pre-shared keys, X.509 public key certificates and Kerberos tickets.

Policy-based network management (PMNM) often is used to determine who can use the resources and services associated with the network, under what conditions they are used, and when. Security policies, for example, define a set of rules governing encryption and access control decisions. The policies can be expressed as a set of rules each of which includes a predicate and an action. In other words, a rule can be expressed as "if <condition> is satisfied, then do <action>."

An exemplary action at the IPsec layer may propose a specific set of security algorithms. Current IPsec protocol implementations typically use packet flow information, such as IP addresses, protocol and ports, to evaluate the policy decisions.

DETAILED DESCRIPTION

Figure 1:
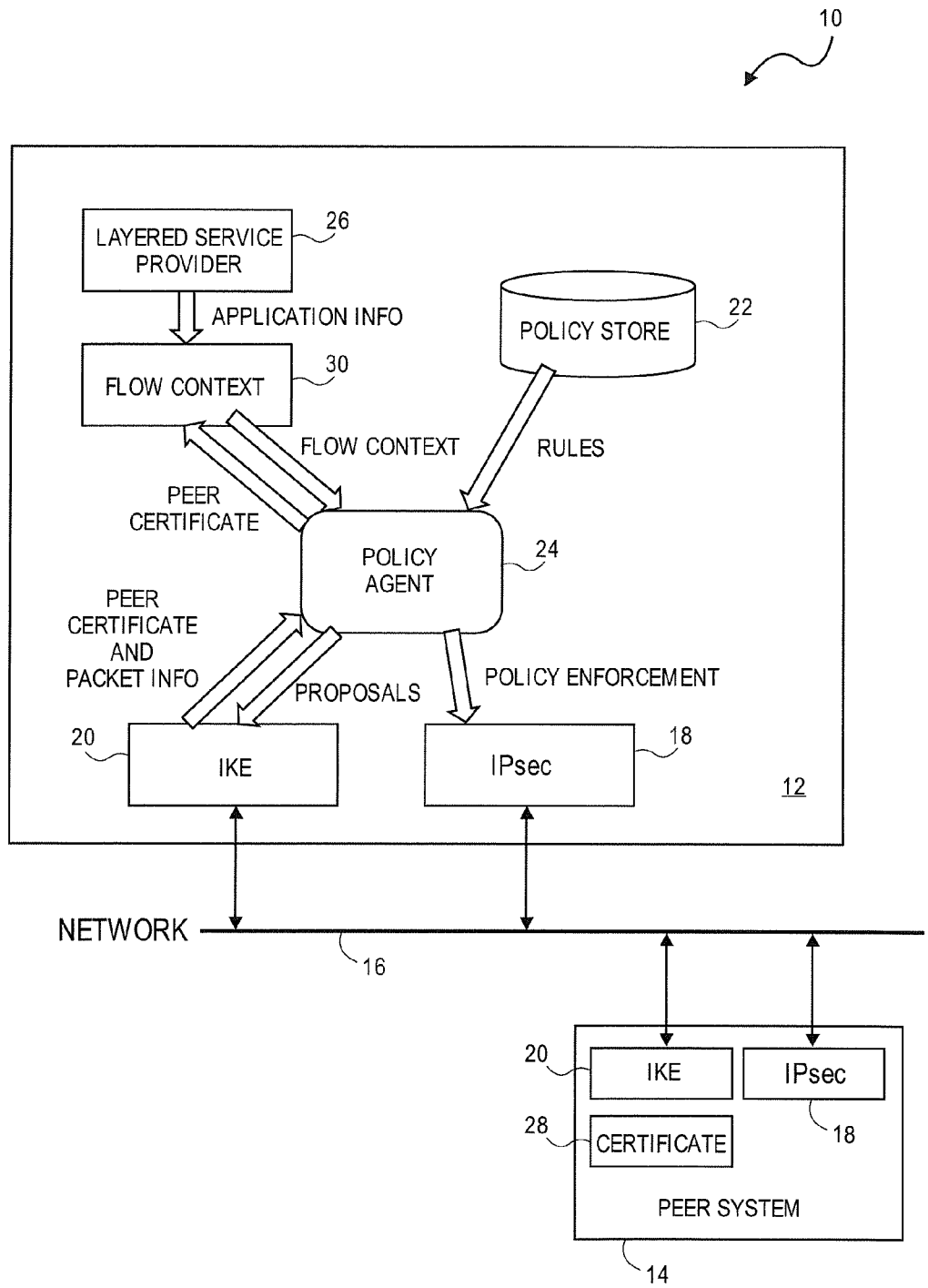
FIG. 1 illustrates a system including IPsec-enabled devices.

FIG. 1 illustrates a system 10 with IPsec-enabled devices 12, 14 that can communicate over a network 16. Each of the devices 12, 14 includes a layered protocol stack that has an IPsec component 18 and an IKE component 20. The device 12 also includes a database 22 that stores rules corresponding to security policies for implementing the security requirements of the device. A policy agent 24 retrieves the rules stored by the database 22 and interprets and evaluates the rules. As described in greater detail below, the policy agent 24 can exchange information with the IKE layer component 20, as well as various information providers, to augment the network flow information that drives the policy decisions.

Figure 2:
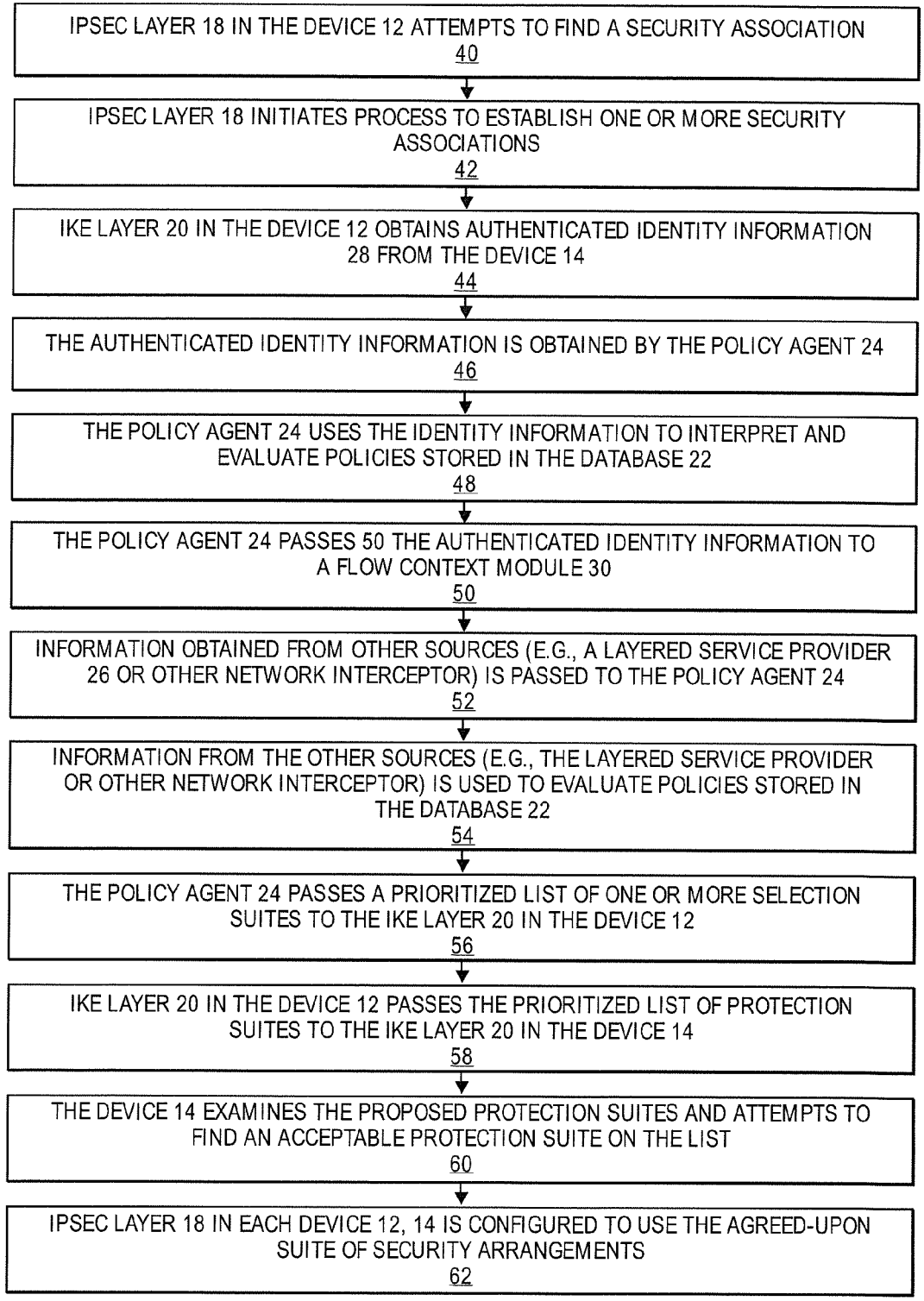
FIG. 2 is a flow chart of a method of establishing a security association.

As indicated by FIG. 2, when the device 12 attempts to send or receive IP data to the other device 14, the IPsec layer 18 in the device 12 attempts to find 40 a security association, in other words, a set of encryption, authentication and/or compression algorithms and keys, to protect the traffic. If a security association is not yet established, the IPsec layer 18 initiates 42 a process to establish one or more security associations to be used for future traffic that matches the same IP address, port and protocol. The IKE protocol is used to negotiate the keys and algorithms of the security associations. During a first IKE phase, the devices 12, 14 exchange and authenticate identity information and establish a secure channel protected by an IKE security association to use for a second IKE phase. During the second phase, the devices 12, 14 negotiate security associations for the IP traffic that is to be protected by IPsec.

Figures 3, 4:
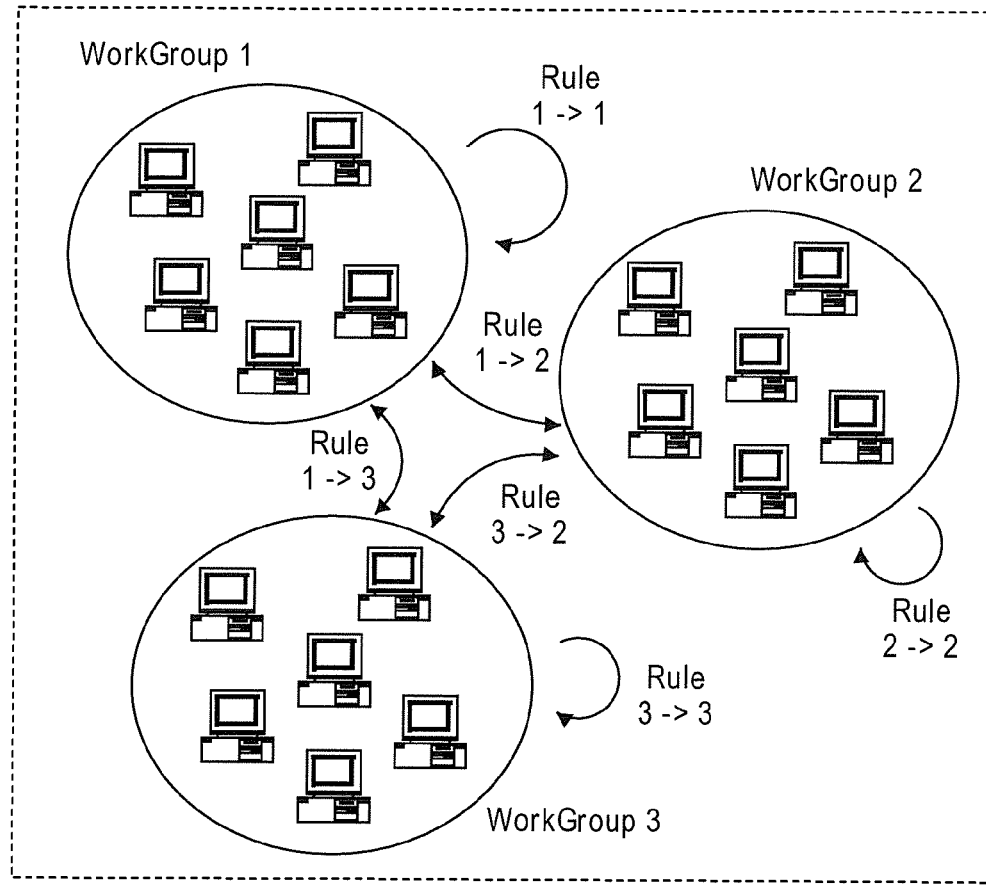
FIG. 3 illustrates workgroups in a policy-based network management infrastructure.
FIG. 4 shows a set of rules associated with the workgroups in FIG. 3.

As noted, during the first IKE phase, the IKE layer 20 in the device 12 obtains 44 authenticated identity information 28 from the device 14. The identity information can include, for example, a digital certificate, a username-password pair or a Kerberos ticket. The identity information can identify a peer device and may be associated with a particular device such as the device 14 or a group of devices. Alternatively, the identity information may be associated with a particular individual or group of individuals. For example, a hospital may have doctors, nurses and administrative staff organized in workgroups each of which may have specific access privileges and security requirements. The identity information can be associated with a particular group of the hospital staff. FIG. 3 illustrates three exemplary workgroups in a policy-based network management infrastructure. Each client (machine or user) in a workgroup has an ordered list of policy objects, and each policy object includes a set of rules to apply to traffic flows between two endpoint lists. For example, the source list can identify machines in the source workgroup, whereas the destination list can identify machines in the destination workgroup. Smart cards, which can store certificates in a secure manner, can enable tying the certificate to one or more users rather than to the machines. The certificate would then identify the user or the machine as being a member of a particular workgroup. The non-packet flow information can include biometric data that identifies the user as well.

Once the IKE layer 20 in the device 12 obtains the authenticated identity information, the identity information is obtained 46 by the policy agent 24. The IKE layer 20 can include an application programming interface (API) to allow the policy agent 24 to extract the authenticated identity information. Alternatively, the IKE layer 20 can send the authenticated identity information to the policy agent. The policy agent 24 can use the identity information to interpret and evaluate 48 policies that are stored in the database 22 and that include a condition referring to the IKE layer identity information. For example, a particular policy may indicate that if the identity information includes a particular digital certificate, then traffic must be sent in the clear, denied or secured using a set of security parameters. Exemplary forms for the rules associated with one of the workgroups of FIG. 3 are shown in FIG. 4. In general, the sets of rules should be symmetrical and synchronized across all the workgroups.

The policy agent 24 also can pass 50 the authenticated identity information to a flow context module 30 which may reside within the policy agent or which may be separate from the policy agent. The module 30, which can be implemented, for example, in random access memory (RAM), serves as a repository for information that can flow to the policy agent 24. The module 30 also can obtain additional information from other sources, such as a layered service provider 26 or other network interceptor. The information obtained from the layered service provider 26 then can be passed 52 to the policy agent 24 and used to evaluate 54 IPsec policies stored in the database 22. That allows IPsec policies to be based on a specific application, as well as the identity of the logged-in user and/or peer identities. For example, in some implementations, the layered service provider 26 would determine that a certain application is responsible for a specific connection request and would advertise the application's name as "Application=XYZ." The form in which the extended information is represented can be similar to the form in which the identity information is represented. Therefore, the same syntax can be used when incorporating the IKE layer identity information or the information from the layered service provider 26 into predicates in the policies. Some sources of context information, such as user-loadable programs and dynamic link libraries (DLLs) may require authentication by the policy evaluator to certify the reliability of the information they provide. Such authentication can be provided using bilateral software authentication technology. Preferably, information obtained from other sources such as the layered service provider 26 is used to augment, but not override, values in the authenticated identity information obtained from the IKE layer 20.

The non-packet flow information that is received, for example, through the flow context module 30 can be viewed as a set of attributes each of which has an associated value. The packet flow itself is identified by several parameters, including a source address, a source port, a destination address, a destination port and a protocol. Those parameters can be added to the flow context information so that as data packets are processed, there is sufficient information to look up the corresponding flow context information to evaluate the policy rules. Such a technique can facilitate integration of the non-packet flow information with the packet flow information.

Once the policy agent 24 evaluates the policies in the database 22, the policy agent 24 passes 56 a prioritized list of one or more protection suite proposals to the IKE layer 20 in the device 12. The IKE layer 20 in the device 12 then passes 58 the prioritized list of protection suite proposals to the IKE layer 20 in the device 14. The device 14 examines 60 the proposed protection suites and attempts to find an acceptable protection suite on the list. Once the devices 12, 14 agree on an acceptable security arrangement, the IPsec layer 18 in each device is configured 62 to use the agreed-upon suite of security arrangements during the second phase of the IKE protocol.

As mentioned previously, various types of non-packet flow information can be incorporated into the predicates of IPsec policies. Specific examples include user identity data, application identifiers, and application modes. User identity data, for example, can be obtained from smart cards or biometric devices. Such identity data also can include a password entered, for example, when the user logs on to the system. The digital certificate information can include fields such as the certificate serial number, the subject's name, the subject's public key, the subject's alternate names, key identifiers and the expiration date of the certificate. The information in any of those fields can be incorporated into the predicates of one or more policy rules, and the received digital certificate can be used to evaluate the rules.

If the IKE layer 20 in the first device is unable to authenticate identity information from the second device 14 during the IKE session, then the IKE layer itself may act as an information provider. For example, the IKE layer 20 can indicate to the policy agent 24 that authenticated identity information is unavailable for the particular connection request. The policy agent 24 would then use that fact to evaluate one or more default policies in the database 22.

In one particular scenario, an application identifier can be used to evaluate IPsec policies as follows. An application (not shown) loads a layered service provider DLL automatically as it loads Winsock 2 to perform network communications. The layered service provider hashes the application binary executable file and looks it up in a database of known applications. The layered service provider then signs the application identifier and passes the signed value to the module 30 along with the packet flow information (i.e., address, port and protocol). The module 30 creates a record for the data flow, checks the validity of the application identifier, and adds the identifier to the flow context. As the policy agent 24 evaluates the policies in the database 22, rules that specify an application identifier are evaluated against the application identifier in the context record.

An application also can declare and sign the mode in which it is running Examples include a browser running in Secure Socket Layer (SSL), an electronic mail (e-mail) application sending or receiving messages, and a browser accessing web sites on a particular domain. As the policy agent 24 evaluates the policies in the database 22, rules that specify an application mode are evaluated against the actual mode in which the application is running.

Although the foregoing description relates to the use of non-packet flow information to evaluate policies and negotiate a security association during the first phase of an IKE session, the non-packet flow information also can be used during subsequent phases of an IKE session to evaluate policies and negotiate security associations.

Various features of the system can be implemented in hardware, software, or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer, for configuring and operating the computer when the storage medium is read by the computer to perform the functions described above.

Other implementations are within the scope of the following claims.

What is claimed is:

1. A method of establishing network security comprising between a first and second network device, the device comprising, at the first network device:
   determining whether a security association is established with a second network device;
   during a first phase, obtaining non-packet flow information from the second network device when it is determined that a security association is not established, the non-packet flow information for enabling future communication with the second network device;
   evaluating a policy rule based on the obtained non-packet flow information, wherein the non-packet flow information includes biometric data that identifies a user;

during a second phase, proposing to the second network device a security arrangement based on the evaluation; and configuring the first network device to a proposed security arrangement to communicate securely with the second network device, wherein the second network device is also configured to the proposed security arrangement, wherein the first and second phases are phases of an Internet Key Exchange, IKE, protocol.

2. The method of claim 1 wherein the non-packet flow information includes peer identity information, wherein the obtaining the non-packet flow information, and proposing the security arrangement are performed by an IKE later, and wherein configuring to the proposed security arrangement is performed by the Internet Protocol security, IPsec, layer.

3. The method of claim 1 further comprising including obtaining the user identity information from a smart card.

4. The method of claim 1 wherein the non-packet information includes authenticated identity information obtained during an Internet Key Exchange protocol session.

5. The method of claim 4 wherein the identity information is included in a digital certificate.

6. The method of claim 4 wherein the identity information is included in a Kerberos ticket.

7. The method of claim 1 further comprising obtaining the non-packet flow information from a network interceptor.

8. The method of claim 1 wherein obtaining the non-packet flow information includes an application identifier.

9. The method of claim 1 wherein the non-packet flow information further includes an identification of a mode in which an application is executing.

10. The method of claim 1 further comprising configuring an Internet Protocol security layer according to the proposed security arrangement.

11. A security-enabled device comprising:
a protocol stack;
a database of policy rules; and
a policy agent to:
obtain during a first phase, non-packet flow information received from a second device when it is determined that a security association is not established, the non-packet flow information for enabling future communication with the second device;
evaluate a policy rule based on the obtained non-packet flow information, wherein the non-packet flow information includes biometric data that identifies a user, and;
propose, to the second device during a second phase, a security arrangement based on the evaluation for future communications with the second device; and
an IPsec component to communicate securely with the second device via the proposed security arrangement, wherein the first and second phases are phases of an Internet Key Exchange, IKE, protocol.

12. The device of claim 11 wherein the policy agent is configured to receive nonpacket flow information from a network interceptor and to evaluate a policy rule stored in the database based on the received information, wherein the proposed security arrangement depends on the received non-packet flow information, and wherein the policy is configured to receive non-packet flow information and propose a security arrangement via the IKE layer, and wherein the configuring of the device to the proposed security arrangement is performed by the Internet Protocol security, IPsec, layer.

13. The device of claim 11 wherein the policy agent is arranged to configure an Internet Protocol security component according to the proposed security arrangement if, during an Internet Key Exchange session, the second device agrees to use the proposed security arrangement.

14. An article comprising a non-transitory computer-readable medium having stored thereon instructions that, when executed by one or more processors, cause the one or more processors to perform operations to establish network security comprising between a first and second network device, the device comprising, at the first network device:
determining whether a security association is established with a second network device;
during a first phase, obtaining non-packet flow information from the second network device when it is determined that a security association is not established, the non-packet flow information for enabling future communication with the second network device;
evaluating a policy rule based on the obtained non-packet flow information, wherein the non-packet flow information includes biometric data that identifies a user;
during a second phase, proposing to the second network device a security arrangement based on the evaluation; and
configuring the first network device to a proposed security arrangement to communicate securely with the second network device, wherein the second network device is also configured to the proposed security arrangement, wherein the first and second phases are phases of an Internet Key Exchange, IKE, protocol.

15. The article of claim 14 wherein the non-packet flow information includes peer identity information, wherein the obtaining the non-packet flow information, and proposing the security arrangement are performed by an IKE later, and wherein configuring to the proposed security arrangement is performed by the Internet Protocol security, IPsec, layer.

16. The article of claim 14 further comprising including obtaining the user identity information from a smart card.

17. The article of claim 14 wherein the non-packet information includes authenticated identity information obtained during an Internet Key Exchange protocol session.

18. The article of claim 17 wherein the identity information is included in a digital certificate.

19. The article of claim 17 wherein the identity information is included in a Kerberos ticket.

20. The article of claim 14 further comprising obtaining the non-packet flow information from a network interceptor.

21. The article of claim 14 wherein obtaining the non-packet flow information further includes an application identifier.

22. The article of claim 14 wherein the non-packet flow information further includes an identification of a mode in which an application is executing.

23. The article of claim 14 further comprising configuring an Internet Protocol security layer according to the proposed security arrangement.

24. A communications system comprising:
first and second Internet Protocol security-enabled devices, wherein both devices include respective protocol stacks having an Internet Key Exchange component and an Internet Protocol security component; and
a network over which the first and second devices can communicate, wherein the first device further includes a database of policy rules and a policy agent:
obtain during a first phase, non-packet flow information received from a second device when it is determined that a security association is not established, the non-packet flow information for enabling future communication with the second device;

evaluate a policy rule based on the obtained non-packet flow information, wherein the non-packet flow information includes biometric data that identifies a user, and;

propose, to the second device during a second phase, a security arrangement based on the evaluation for future communications with the second device; and an IPsec component to communicate securely with the second device via the proposed security arrangement, wherein the first and second phases are phases of an Internet Key Exchange, IKE, protocol.

25. The system of claim 24 wherein the policy agent is configured to receive non-S packet flow information from a network interceptor and to evaluate a policy rule stored in the database based on the received information, wherein the proposed security arrangement depends on the received non-packet flow information, wherein the policy agent is configured to receive non-packet flow information and propose a security arrangement via the IKE layer, and wherein configuring the proposed security arrangement is performed by the Internet Protocol security, IPsec, layer.

26. The system of claim 24 wherein the policy agent is arranged to configure the first device's Internet Protocol security component according to the proposed security arrangement if, during an Internet Key Exchange session, the second device agrees to use the proposed security arrangement.

* * * * *